TAPE HOLDER

Filed Nov. 8, 1965 2 Sheets-Sheet 1

INVENTOR.
DELMAR R. JOHNSON

BY Anderson, Luedeka, Fitch, Even & Tabin
ATTORNEYS

April 16, 1968 D. R. JOHNSON 3,378,212

TAPE HOLDER

Filed Nov. 8, 1965 2 Sheets-Sheet 2

INVENTOR.
DELMAR R. JOHNSON

BY Anderson, Luedeka, Fitch, Even & Tabin

ATTORNEYS 3,378,212
Patented Apr. 16, 1968

3,378,212

TAPE HOLDER

Delmar R. Johnson, Des Plaines, Ill., assignor to Ampex Corporation, Redwood City, Calif., a corporation of California Filed Nov. 8, 1965, Ser. No. 506,668
8 Claims. (Cl. 242—55.12)

ABSTRACT OF THE DISCLOSURE

A tape threading system is provided in which at least three supporting members are disposed under a cover to engage the free end of a tape inserted through a slot in the cover. The members are so positioned along the slot that the tape path is tortuous so as to provide a total area of contact between the members and the tape and an amount of bending of the tape such that the resistance to bending of the tape causes a frictional force which yieldingly holds the free end of the tape.

This invention relates generally to tape holding devices and more particularly to an improved tape holder for use in a tape threading system.

Tape threading systems for arranging a tape or flat, elongated strip of material in working position on a particular device such as a takeup reel have been found to be particularly useful in connection with magnetic tape recorders. Such recorders have two turntables on which are mounted respective supply and takeup reels upon which the magnetic tape is wound. To begin the operation of such a machine a length of tape from the supply reel is positioned in proper relation with a magnetic transducer head and a tape driving capstan and is then engaged in a suitable manner with the takeup reel. This initial threading operation generally involves considerable manual handling of the tape which at times is objectionable because it increases the physical wear and tear on the tape and may be difficult and time consuming for unskilled and less dexterous operators to perform. To minimize these problems of threading tape, tape recorders of the magazine type have been used which employ a tape in the form of an endless loop or which employ tape supply and takeup devices on which the tape has been previously threaded. Such machines have objectionable features which have prevented their wide application. For example, the size of the magazine employed imposes limitations upon the length of the tape. With a magazine holding an endless loop, a reverse rewind operation is difficult, if not impossible. Since the tape guiding and driving means for use with such magazines are radically different from conventional designs, it is difficult to obtain high fidelity performance. Also, such magazines cannot be used with magnetic recording or reproducing machines of the more conventional type without considerable alteration.

Some prior developments for improving the threading operation have involved the use of special leaders on the tape in the form of hooks, strips of felt, loops in the tape, special stiff or wide portions of the tape, and the like which are expensive to manufacture, are not standardized for use with the entire range of presently manufactured tape recorders, and may be subject to failure before the useful recording life of the tape itself is exhausted.

Another approach to the problem of threading a takeup reel which has minimized many of these problems has been to provide a takeup reel including a hub formed by a base and upstanding teeth spaced about its periphery and to dispose a covering or housing over the takeup reel which covering is provided with an elongated slot extending across the reel. In such a system the leading portion of the tape is manually moved edgewise through the slot and positioned so that it passes between two adjacent teeth on each side of the reel. When the reel is caused to rotate, the teeth engage the tape and cause it to be wound on the reel.

This latter approach has led to certain problems in tape recorders because it is commonly desired that they be capable of being threaded and of operating with their reels in a generally vertical plane and positioned above the recording and reading heads. In such an orientation the slot and the leading portion of the tape will normally be substantially vertical and the weight of the leading portion will cause it to fall from its position before rotation of the reel and engagement of the teeth with the tape can secure this portion to the reel. Since it is desirable that the operator have both hands free to operate the recorder controls, it has been necessary to provide holding means for the leading portion of the tape which will hold the leading portion of the tape against the force of gravity but will release the leading portion to permit it to be wound on the reel when rotation of the reel begins. Such a holding means is also useful when the recorder reels are disposed horizontally if the means is so constructed that the tape is gradually, rather than instantaneously, released. With a gradual release, a drag is created on the tape so that the teeth on the takeup reel are more likely to engage the tape securely as the reel begins to rotate, and the operation of the threading system is more reliable than when the release is abrupt. The holding means is usually disposed adjacent the upper end of the slot opposite the entry end and under the reel housing.

One form of such holding means has been a pair of friction pads of a resilient material such as sponge rubber which project toward one another from opposite edges of the elongated slot. The pads are positioned at the upper end of the slot and are so positioned and dimensioned that the tape may be inserted edgewise between them. The coefficient of static friction between the pads and the tape is such that the tape will be held by them against the force of gravity acting on the leading portion of the tape. When additional force is exerted longitudinally on the tape by rotation of the reel, the friction force is overcome and the tape slips out from between the pads and is wound on the reel.

These devices have suffered from certain disadvantages in construction and operation. Since the tape is extremely narrow the exact spacing of the pads from one another has been critical. If the space between the pads is too wide, the pads will not engage and hold the tape; if the space is too narrow, it will be impossible to insert the tape. Even when the pads are properly placed it may be difficult to insert the tape between them due to the flexibility of the tape and the resistance to transverse motion of the tape caused by the friction of the pads and tape. Injury to the tape may result from forcing the tape against the pads if the edge of the tape and the space between the pads is not properly aligned. Furthermore, the pads tend to be cut by the sharp edge of the tape, necessitating relatively freqeunt replacement of the pads, in the course of which the critical problem of pad spacing again arises. Accordingly, a need has arisen for an improved holding means for a tape threading system which will eliminate these problems.

It is, therefore, an important object of this invention to provide an improved tape holder for a tape threading system.

A further object of the invention is to provide a tape holder for a tape threading system which will facilitate insertion of the tape into the system.

A still further object of the invention is to provide a tape holder for a tape threading system which will be simple in construction and installation.

Another object of the invention is to provide a tape holder for a tape threading system which will be long lasting in use and not susceptible to damage by a sharp edged tape.

Yet another object of the invention is to provide a tape holder for a tape threading system which will minimize injury to the tape caused by the threading process.

Still another object of the invention is to provide a tape holder for a tape threading system which will hold the leading portion of the tape against the force of gravity when the leading portion is vertically disposed and which will gradually release said leading portion in response to a longitudinal force exerted on the tape regardless of its orientation.

Other objects and advantages of the invention will become apparent from the following description when considered in conjuction with the accompanying drawings in which.

Figure 1:
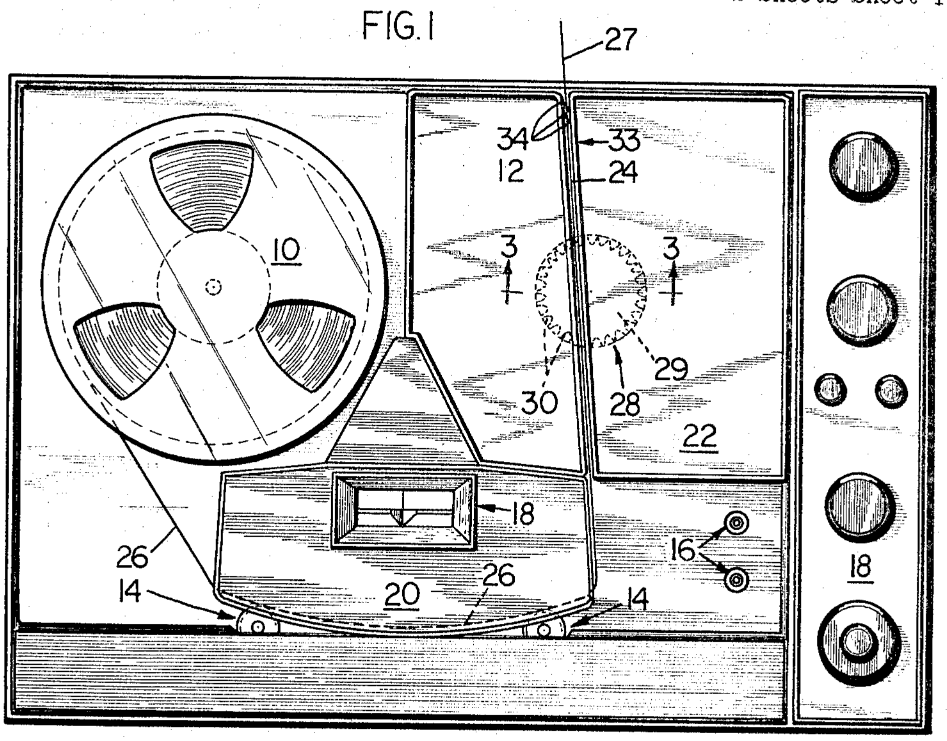
FIGURE 1 is an elevational view of a magnetic recorder with a tape threading system utilizing the present invention.
Figure 2:
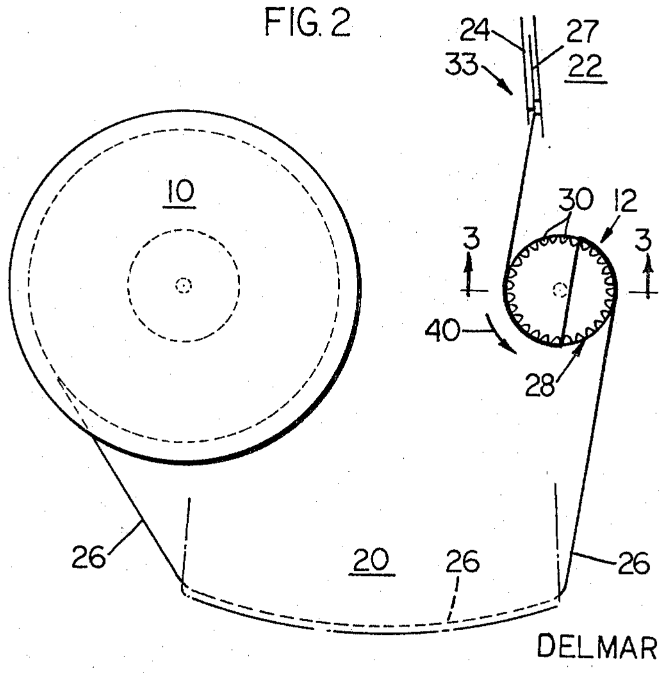
FIGURE 2 is a partially diagrammatic and partially broken away elevational view of the tape threading system of FIGURE 1 showing the tape after the takeup reel has gone through a half revolution.
Figure 3:
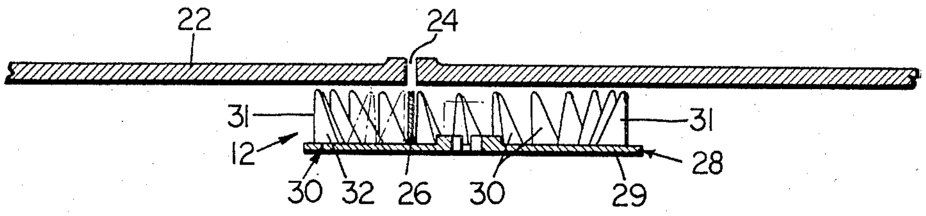
FIGURE 3 is a fragmentary sectional view taken along line 3—3 of FIGURES 1 and 2.

Referring now to FIGURES 1 and 2, a tape recorder upon which an embodiment of the invention is shown has a supply reel 10, a takeup reel 12, pinch rollers 14 (which work in conjunction with capstans, not shown), jacks 16, and controls and control panels identified wherever they appear by the numeral 18. The various recording and erasing heads of the tape recorder are under a head housing 20. A reel housing 22 covers the takeup reel. The reel housing 22 has an elongated slot 24 extending completely across the housing 22 and across the takeup reel 12 from a point adjacent the head housing 20. A tape 26, having a leading portion 27, is inserted edgewise through the slot 24 into the reel housing 22. The takeup reel 12 comprises a hub 28 formed by a base 29 and a plurality of teeth 30 disposed on its periphery, each of which has a surface 31 perpendicular to the base which faces outwardly from the base for the tape to wind on and a surface 32 perpendicular to the base which faces in the direction of rotation of the reel. The tape, when moved through the slot 24 and into the reel housing 22 is positioned between a pair of teeth 30 on each side of the periphery of the hub.

It may be seen that when the recorder is positioned with the reels 10 and 12 in a vertical plane and above the head housing 20, the leading portion 27 of the tape 26 will be substantially vertical and, therefore, will fall out of its proper position between the teeth 30 unless it is prevented from doing so. Accordingly, a tape holder 33 is provided in the reel housing 22, which as illustrated, is at the far end of the slot, or, in other words, at the end of the slot 24 opposite the end where the tape 26 enters the reel housing 22 from the head housing 20.

Figure 4:
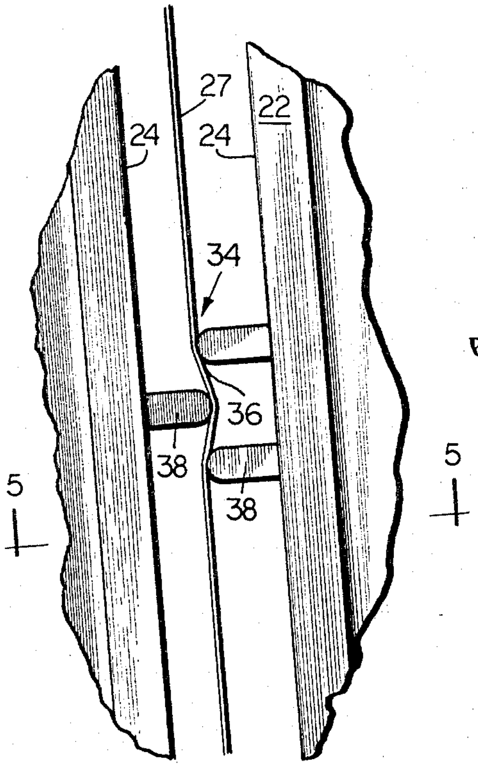
FIGURE 4 is a detailed elevational view of the slot and improved tape holder with the tape being held by the improved tape holder.
Figure 5:
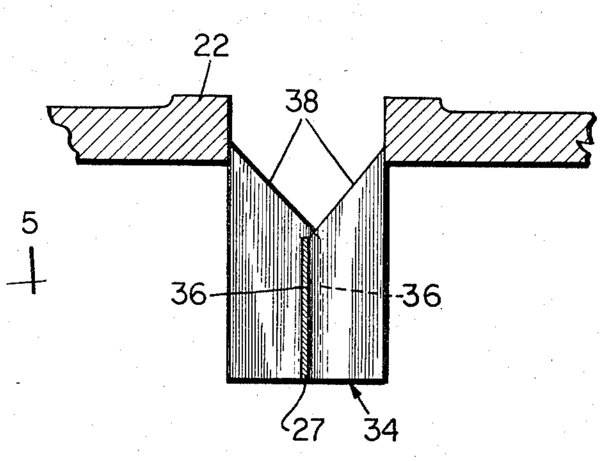
FIGURE 5 is a plan view of the slot and tape holder looking along the line 5—5 of FIGURE 4.

The improved tape holder 33 provided by applicant for the purpose of preventing the tape from falling may be seen most clearly in FIGURES 4 and 5. Generally, it comprises a plurality of fingers or supporting members 34 positioned in the reel housing 22 and alternately on opposite edges of the slot 24. The members 34 are so positioned and dimensioned that the leading portion 27 of the tape 26 inserted edgewise through the slot 24 and between the members 34 is engaged by them and bent into a tortuous configuration so as to be yieldingly held by the members.

More specifically, in the illustrated embodiment three fingers are provided with the upper and lower fingers projecting from one edge of the slot 24 and the middle finger projecting from the other edge of the slot. The invention is not limited to this particular number of fingers, however. Each of the fingers includes an end portion 36 which is spaced from the reel housing and a tapered portion 38 which is between the end portion 36 and the reel housing 22.

The end portions 36 of the fingers project at least far enough from the edges of the slot that a tape inserted edgewise between the end portions is constrained into a tortuous configuration as shown clearly in FIGURE 4. As illustrated, the fingers project from each edge an equal amount which is slightly more than one half of the distance across the slot. It will be apparent, however, that a tortuous configuration will result whenever the thickness of the tape plus the total amount of projection of adjacent end portions from the two edges of the slot is greater than the width of the slot.

The stiffness of the tape or its resistance to bending causes the end portions of the fingers and the portions of the tape which have been thus bent to exert forces on one another. These forces have components that are normal to the adjacent surfaces. As a result of these normal forces, a pulling force exerted on the tape such as by gravity, will be opposed by a frictional force exerted by the end portions of the fingers on the tape. This friction force will oppose any sliding of the tape around the end portions. The surface of the end portions is selected so that the static coefficient of friction between the end portions and the tape results in such an opposing force which is sufficient to counteract the force of gravity on the tape, but not great enough to prevent the sliding of the tape around the end portions of the fingers when the tape is pulled downward by rotation of the reel. Thus when the pulling force on the tape is made great enough the tape 26 will slide around the portions of the fingers and out of the tape holder and be wound on the reel. The force required to accomplish this must not be so great as to break the tape.

In a specific embodiment of the invention where the tape used is conventional audio magnetic recording tape, it has been found satisfactory to utilize three fingers and to make the surface of the end portions 36 of a smooth plastic. This results in a frictional holding force which counterbalances the pull of gravity yet which is easily overcome by rotation of the reel so that the tape is gradually withdrawn lengthwise from the holding means and wound on the reel.

In the illustrated embodiment, insertion of the tape between the end portions 36 is facilitated by the tapered portions 38 on the fingers which are positioned between the end portions 36 and the reel housing 22. Each tapered portion 38 extends between the surface of the end portion 36 of a finger and the edge of the slot from which that finger extends. Thus tape is easily inserted edgewise through the relatively wide slot and, as it moves further into the reel housing 22, is guided by the tapering entry portions into the tortuous configuration illustrated in FIGURE 4 between the end portions 36. Since the tape is required to move past the entry portions 38, and naturally comes in contact with them, it is desirable that the surfaces of the entry portions have a low coefficient of friction such as that of a smooth plastic.

The holding portions 36 and entry portions 38 of the fingers are each desirably formed with convexly curved surfaces. This feature further facilitates the edgewise motion of the tape 26 when it is inserted through the slot as well as the sliding motion of the tape around the end portions 36 as it is pulled out of the tape holder 33 by rotation of the takeup reel 12. Furthermore, the feature avoids cutting of the tape which could take place if the surfaces were in the form of planes meeting at sharp edges.

In the performance of the threading operation utilizing the improved tape holder, the tape 26 is stored in the supply reel 10 which is placed upon the tape recorder. The leading portion 27 of the tape 26 is drawn around the housing 20 and thereafter is pulled to the position shown in FIGURE 1, inserted edgewise through the slot 24 on the takeup reel cover 22 and moved into engagement with the reel 12 and tape holder 33.

More specifically, the longitudinal edge of the tape is initially held straight as it moves through the slot 24 by a slight pulling force exerted on its leading end. As the edge of the tape 26 contacts the entry portions 38 and continues to be moved toward the end portions 36, it is gradually bent into the tortuous configuration shown in FIGURE 4. It will be noted that at the same time the edge of the tape is moved into a position between two teeth 30 on each side of the periphery of the takeup reel.

Immediately upon rotation of the reels 10 and 12 in the direction shown by the arrow 40, the tape 26 is forced against the surfaces 32 of two of the teeth 30 to which it happens to be adjacent. The friction of the tape 26 against the surfaces 32 of teeth 30 prevents slippage in the position of the tape on the reel. Upon rotation of the takeup reel, the tape bends around the teeth 30 and is engaged by their outer surfaces 31 so as to be wound on the hub 28. A pulling force is thereby exerted on the tape which overcomes the frictional force exerted by the end portions 36 of the fingers causing the tape to gradually slide lengthwise around them and out of the tape holder. After the takeup reel has gone through about half a revolution as shown in FIGURE 2, the tape 26 doubles over itself and the leading portion 27 pulls free of the holding means 33. The tape is wrapped over itself one or more times as the reel rotates and is thereby held securely on the takeup reel 12 until such time as it is rewound back onto the supply reel 10. In the rewind operation, the tape goes in the direction opposite to that shown by the arrow 40 and ultimately the position as shown in FIGURE 1 is reached, except that the leading end is not held by the holding means 33. At this point, the tape 26 is simply pulled between the teeth 30 and onto the supply reel 10.

It may be seen that the above-described device provides a means of holding tape in a tape threading system which is simple and effective and facilitates insertion of the tape and holding it even in a vertical position. Furthermore, the gradual release of the tape from the improved holding means as the reel begins to rotate is useful in assuring secure engagement of the tape with the reel even when the reel is not in a vertical position. In addition, the tape will not be damaged by the holding device 33 when it is inserted or as it is wound on the reel nor will the sharp edge of a tape cut the holding device 33. As a result, both the device and the tape will have long useful lives.

Various changes and modifications may be made in the above-described tape holding device without departing from the present invention. For example, various numbers of fingers could be utilized, and they could be made of a variety of materials which would fall within the spirit and scope of the invention, various features of which are set forth in the accompanying claims.

What is claimed is:

1. In a tape threading system having a takeup reel and a takeup reel cover with an elongated slot defined by opposed edges so positioned that a tape can be inserted therethrough edgewise so as to engage the reel, an improved tape holder comprising at least three rigid supporting members disposed under the cover for engagement with a free end of a tape inserted through the slot to define a path of travel for the tape, said supporting members being spaced successively along the length of said slot and alternately adjacent respective edges of the slot and projecting toward the opposite edge of the slot so that the path defined by said members is tortuous, the spacing of said memebrs along the slot and the amount of projection of said memebrs toward the opposite edge of the slot being such as to provide a total area of contact between said members and the tape and an amount of bending of the tape that the resistance to bending of the tape causes a frictional force between said members and the tape sufficient yieldingly to hold the free end of said tape in a predetermined position.

2. In a tape threading system having a takeup reel and a takeup reel cover with an elongated slot defined by opposed edges so positioned that a tape can be inserted therethrough edgewise so as to engage the reel, an improved tape holder comprising a plurality of supporting members disposed under the cover for engagement with a tape inserted through the slot to define a path of travel for the tape, said supporting members being disposed alternately adjacent respective edges of the slot and projecting toward the opposite edge of the slot so that the path defined by said members is tortuous, each of said members having an end portion spaced from the cover which projects toward the opposite edge of the slot and a tapered portion extending between said end portion and the cover so that a tape inserted through the slot is guided by said tapered portions toward said end portions, said tapered portions having a low coefficient of friction so that the tape is easily moved toward the slot, past said tapered portions and toward said end portions, said end portions having coefficients of friction such that the tape is yieldingly held by said members.

3. In a tape threading system having a takeup reel and a takeup reel cover with an elongated slot defined by opposed edges so positioned that a tape can be inserted therethrough edgewise so as to engage the reel, an improved tape holder comprising a plurality of supporting members disposed under the cover for engagement with a tape inserted through the slot to define a path of travel for the tape, said supporting members being disposed alternately adjacent respective edges of the slot and projecting toward the opposite edge of the slot so that the path defined by said members is tortuous, each of said members having an end portion spaced from the cover which projects toward the opposite edge of the slot and a tapered portion extending between said end portion and the cover so that a tape inserted through the slot is guided by said tapered portions toward said end portions, the total amount of projection of adjacent ones of said members plus the thickness of the tape being greater than the width of the slot so that tape inserted between said members is held by said members.

4. An improved tape holder in accordance with claim 2 wherein said end portions have convexly curved surfaces so that tape is easily bent around and slides past said surfaces.

5. An improved tape holder in accordance with claim 1 wherein the total amount of projection of adjacent ones of said members plus the thickness of the tape is greater than the width of the slot.

6. An improved tape holder in accordance with claim 5 wherein said members have surfaces with coefficients of friction such that the tape is yieldingly held by said members.

7. An improved tape holder in accordance with claim 3 wherein said end portions have convexly curved surfaces so that tape is easily bent around and slides past said surfaces.

8. An improved tape holder in accordance with claim 1 wherein each of said members projects toward the opposite edge of the slot at least one half of the width of the slot.

References Cited

UNITED STATES PATENTS

| | | | |
|---|---|---|---|
| 1,564,995 | 12/1925 | Allen | 242—153 X |
| 1,656,865 | 1/1928 | Mitchell | 242—153 |
| 2,270,438 | 1/1942 | Hill | 242—153 X |
| 3,265,318 | 9/1966 | Ellmore | 242—74 |

FOREIGN PATENTS

| | | |
|---|---|---|
| 894,549 | 4/1962 | Great Britain. |

GEORGE F. MAUTZ, *Primary Examiner.*